United States Patent
Samoto et al.

(10) Patent No.: US 6,832,511 B2
(45) Date of Patent: Dec. 21, 2004

(54) THROTTLE-OPENING SENSOR

(75) Inventors: Haruhiko Samoto, Shizuoka (JP);
Norio Hayashi, Shizuoka (JP);
Michiyuki Suzuki, Shizuoka (JP);
Masahiro Kawamura, Shizuoka (JP)

(73) Assignees: Yamaha Hatsudoki Kabushiki Kaisha, Shizuoka-Ken (JP); Asahi Denso Co., Ltd., Shizuoka-Ken (JP)

( * ) Notice: Subject to any disclaimer, the term of this patent is extended or adjusted under 35 U.S.C. 154(b) by 0 days.

(21) Appl. No.: 10/368,372

(22) Filed: Feb. 20, 2003

(65) Prior Publication Data

US 2003/0159500 A1 Aug. 28, 2003

(30) Foreign Application Priority Data

Feb. 26, 2002 (JP) .................................. P. 2002-049757

(51) Int. Cl.⁷ .............................................. G01M 19/00
(52) U.S. Cl. ........................................ 73/118.1; 73/116
(58) Field of Search .......................... 73/700–756, 116, 73/118.1

(56) References Cited

U.S. PATENT DOCUMENTS

| | | | |
|---|---|---|---|
| 4,679,440 A | * | 7/1987 | Okamura .................. 73/118.1 |
| 4,719,795 A | | 1/1988 | Eitoku et al. |
| 5,899,191 A | | 5/1999 | Rabbit et al. |
| 5,963,124 A | | 10/1999 | Buss et al. |
| 6,089,535 A | | 7/2000 | Mizutani et al. |
| 6,386,020 B1 | * | 5/2002 | Okumura .................. 73/118.1 |

FOREIGN PATENT DOCUMENTS

| | | |
|---|---|---|
| DE | 44 31 455 A1 | 3/1996 |
| EP | 1 014 040 A1 | 6/2000 |
| EP | 1 063 495 A2 | 12/2000 |
| JP | 10-176581 A | 6/1998 |
| JP | 2000046511 A * | 2/2000 ............ G01B/7/30 |

OTHER PUBLICATIONS

Japanese Patent Abstract No. 07034912, dated Feb. 3, 1995.
Japanese Patent Abstract No. 06344968, dated Dec. 20, 1994.

* cited by examiner

Primary Examiner—Edward Lefkowitz
Assistant Examiner—Jermaine Jenkins
(74) Attorney, Agent, or Firm—Sughrue Mion, PLLC

(57) ABSTRACT

A throttle-opening sensor has a detect shaft rotatable about an axis in conjunction with a throttle grip, a pair of rotation terminals respectively disposed on different positions in the same circle with the rotation axis, the pair of rotation terminals being rotatable together with the detect shaft, contact pieces disposed on each of the rotation terminals at predetermined intervals in a rotation-radius direction of the rotation terminal, a printed circuit including conducting pattern portions printed along sliding loci of the contact pieces and, a resistance portion printed in a sliding range of the contact piece of the conducting pattern portion, and generating a resistance against a current flowing in the conducting pattern portion, wherein at least two detection signals variable in mutually opposite directions according to the rotation angles of the throttle grip are generated due to that the contact pieces respectively allow the conducting pattern portions to conduct therebetween.

4 Claims, 4 Drawing Sheets

THROTTLE-OPENING SENSOR

BACKGROUND OF THE INVENTION

1. Field of the Invention

The present invention relates to a throttle-opening sensor which is capable of generating at least two detection signals varying in the mutually opposite directions according to the rotation angle of a throttle grip.

2. Description of the Related Art

For example, a throttle-opening sensor, which is used to detect the throttle-opening of a two-wheeled vehicle, is structured such that it detects the rotation angle of a throttle grip mounted on a handle bar and transmits its detection signal to an electronic control unit carried onboard the two-wheeled vehicle. And, the electronic control unit executes a given operation in accordance with the detection signal transmitted thereto and, based on the operation results of the electronic control unit, not only the ignition timing of an engine but also the opening and closing of an exhaust valve are controlled.

Here, the throttle-opening information is greatly involved in safety during the running operation of the two-wheeled vehicle. Therefore, there is required a dual signal system which includes two signal detect portions and, even in case where one of the signal detect portions is out of order, can carry out various controls during the running operation in accordance with signals obtained from the other signal detect portion. A technology using such dual signal system for carrying out various controls based on the throttle-opening is disclosed, for example, in JP-A-10-176581.

According to the above-cited publication, throttle control is executed using a dual signal system by detecting signals provided by a main sensor and a sub-sensor respectively having the mutually opposite-direction characteristics. That is, as shown in FIG. 3 in the same publication, in a graph in which the opening angle of the throttle grip is shown in the horizontal axis and the output voltage is shown in the vertical axis, as the opening angle increases, one sensor falls linearly, whereas the other sensor rises linearly; the two sensors are previously adjusted so that their respective graphs are symmetric; and, the sum of the output voltages in every opening angles is set such that it always provides a constant value (5 V).

Therefore, in case where one of the sensors is out of order, the detected value of the output voltage from this sensor decreases down substantially to 0 to thereby cause the sum of the output voltages to differ, which makes it possible to recognize that one sensor is out of order. In this case, various controls are carried out in accordance with only the output voltage of the other sensor to thereby secure the safety during the running operation of the vehicle.

However, in the above-mentioned conventional throttle-opening sensor, the dual signal system is structured by disposing potentiometers at different positions, which raises a problem that the number of parts increases and the structure of the throttle-opening sensor is complicated. Further, since each of the potentiometers is composed of a unit, the whole structure of the throttle opening sensor is large.

SUMMARY OF THE INVENTION

The present invention aims at eliminating the above-mentioned drawbacks found in the conventional throttle-opening sensor. Accordingly, it is an object of the present invention to provide a throttle-opening sensor which not only can reduce the number of parts to simplify the structure of the throttle-opening sensor but also can reduce the size of the whole throttle-opening sensor.

According to the present invention as set forth in a first aspect, there is provided a throttle-opening sensor, comprising a detect shaft rotatable about an axis in conjunction with a throttle grip, a pair of rotation terminals respectively disposed on different positions in the same circle with the rotation axis of the detect shaft as a center thereof, the pair of rotation terminals being rotatable together with the detect shaft, first and second contact pieces disposed on each of the rotation terminals at predetermined intervals in a rotation-radius direction of the pair of rotation terminals, a printed circuit including a first conducting pattern portion printed along sliding loci of the first contact pieces and a second conducting pattern portion printed along sliding loci of the second contact pieces and a resistance portion printed in a sliding range of the first or second contact piece of the first or second conducting pattern portion, and generating a resistance against a current flowing in the first or second conducting pattern portion wherein at least two detection signals variable in mutually opposite directions according to the rotation angles of the throttle grip are generated due to that the first and second contact pieces respectively allow the first and second conducting pattern portions to conduct therebetween.

According to the above structure, in case where the detect shaft is worked with the throttle grip, the pair of rotation terminals are respectively rotated and also the first and second contact pieces allow the first and second conducting pattern portions to conduct therebetween. The current flowing during such conduction is set as an output voltage which corresponds to the rotation angles of the rotation terminals variable due to the resistance of the resistance portion, while the detection signals generated by one rotation terminal and the other rotation terminal vary in the mutually opposite directions.

According to the present invention as set forth in a second aspect, in a throttle-opening sensor as set forth in the first aspect, wherein one of the first and second conducting pattern portions is formed as a circular-ring-shaped portion with the rotation center of the pair of rotation terminals as a center thereof, at least two of the resistance portions are disposed on mutually opposed portions in the circular-ring-shaped portion respectively, and the other is formed on outside of the circular-ring-shaped portion as an arc-shaped portion.

According to the present invention as set forth in a third aspect, wherein the resistance portion is formed by printing carbon on the printed circuit, and resistance value of the resistance portion is variable according to density of the printing.

DETAILED DESCRIPTION OF THE PREFERRED EMBODIMENTS

Now, description will be given below in detail of an embodiment of a throttle-opening sensor according to the present invention with reference to the accompanying drawings.

Figure 7:
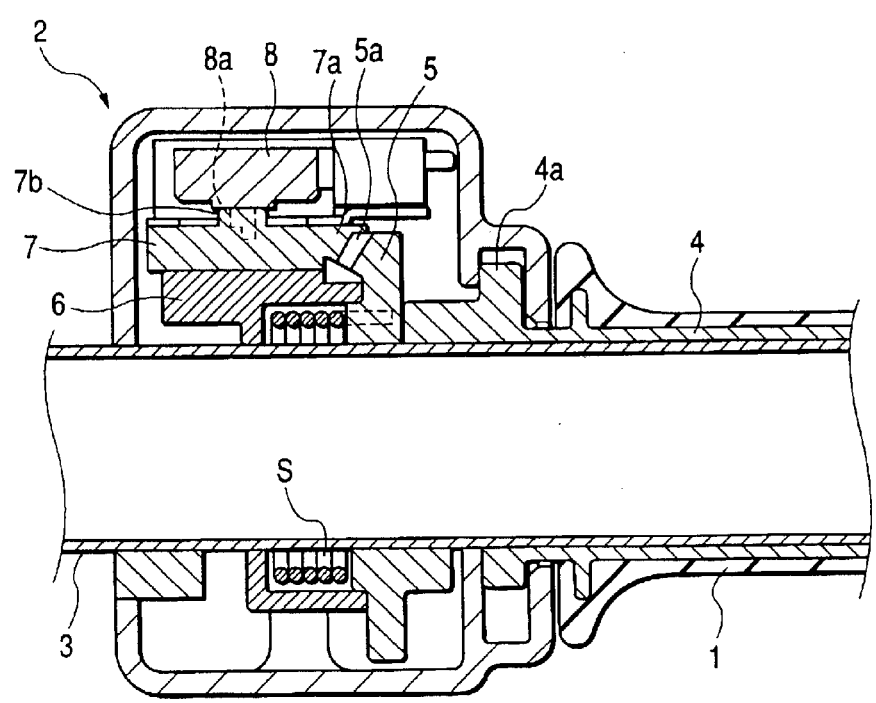

A throttle-opening sensor according to the present embodiment can detect the rotation angle of a throttle grip mounted on the handle bar of a two-wheeled vehicle in the form of double values and transmit detection signals respectively representing the double values to an electronic control unit such as an ECU carried onboard a two-wheeled vehicle; and, the present throttle-opening sensor can be applied to, for example, such a throttle-opening detect apparatus as shown in FIG. 7 which is disposed in a resin-made case 2 fixed to the right handle bar 3 of the two-wheeled vehicle.

In FIG. 7, in case where a throttle grip 1 mounted on the leading end portion of the right handle bar 3 is rotated, a tube guide 4 interposed between the throttle grip 1 and right handle bar 3 is also rotated. Due to the rotation of the tube guide 4, a base end portion 4a formed on the base end side (in FIG. 7, the left side) of the tube guide 4 is rotated and thus a drive gear 5 secured to the base end portion 4a is also rotated.

The drive gear 5 has a bevel gear including an inclined teeth portion 5a formed in the upper portion of the drive gear 5 and is structured so as to be rotated substantially in the same direction as the throttle grip 1. The drive gear 5 is disposed in such a manner that its teeth portion 5a is in meshing engagement with a teeth portion 7a formed in a driven gear 7; and, therefore, the driven gear 7 can be rotated in a direction substantially perpendicular to the rotation direction of the drive gear 5. By the way, in FIG. 7, reference character 6 designates a storage member for storing therein a return spring S which is used to urge the throttle grip 1 toward the return side thereof; and, the driven gear 7 is rotatably disposed on the upper surface of the storage member 6.

In the central portion of the driven gear 7, there is formed a boss portion 7b which projects upwardly; and, the detect shaft 8a of a throttle-opening sensor 8 is inserted into and secured to a recessed portion formed in the boss portion 7b. That is, in case where the throttle grip 1 is rotated, the detect shaft 8a can be rotated through the tube guide 4, drive gear 5 and driven gear 7; and, in case where the rotation angle of the detect shaft 8a is detected, the rotation angle of the throttle grip 1, namely, the throttle-opening can be detected.

Figure 1:
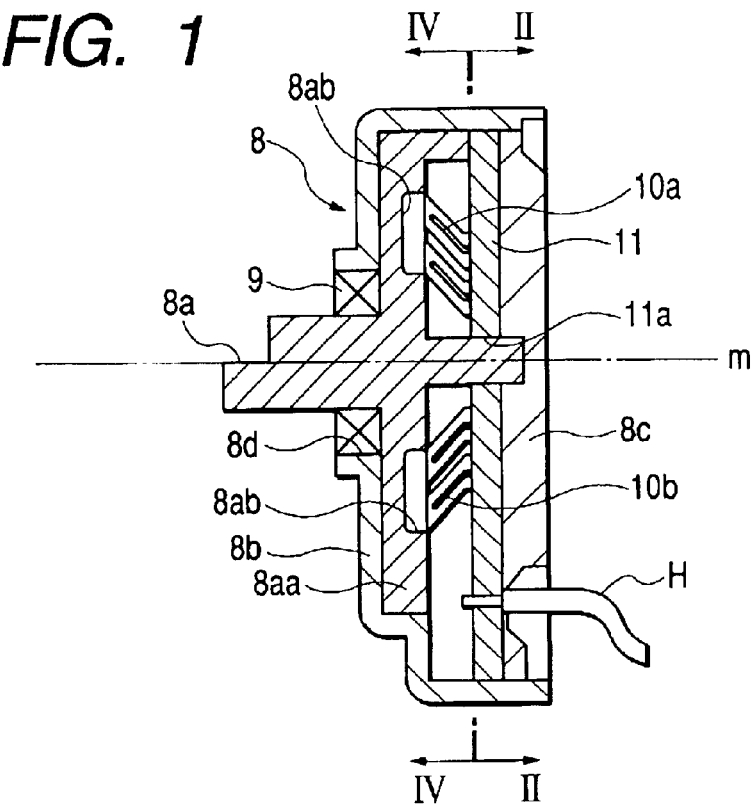
FIG. 1 is a longitudinal section view of a throttle-opening sensor according to an embodiment of the present invention.

The throttle-opening sensor 8 can detect the rotation angles of the detect shaft 8a in the form of double values and transmit detection signals respectively representing the double values to an electronic control unit; and, as shown in FIG. 1, the outer shape of the throttle-opening sensor 8 is formed by resin-made case 8b and cover 8c. In the central portion of the lower portion of the case 8b, there is formed an insertion hole 8d through which the detect shaft 8a can be inserted and, between the inner peripheral surface of the insertion hole 8d and detect shaft 8a, there is interposed an oil seal 9.

Figure 4:
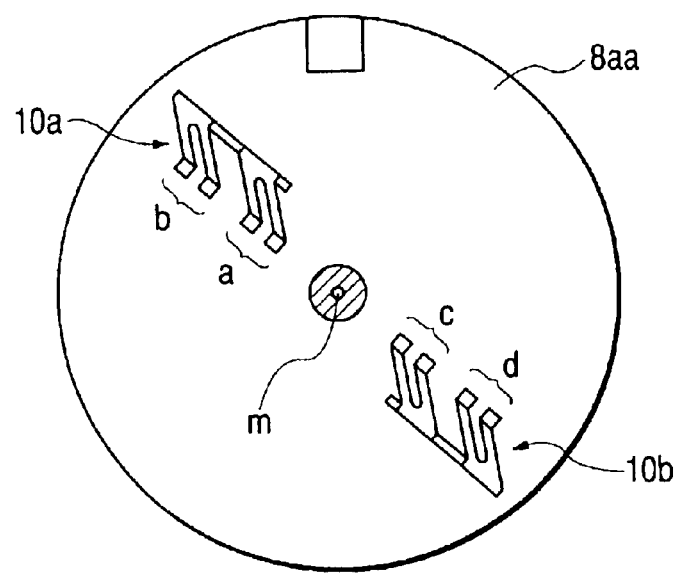
FIG. 4 is a typical view of the rotation terminals used in a throttle-opening sensor according to the embodiment of the present invention (a view taken along the arrow line IV—IV shown in FIG. 1), showing a state in which they are disposed in the rotation plate portion of a detect shaft.

Also, in the side surface of the detect shaft 8a, as shown in FIG. 4, there is formed a disk-shaped rotation plate portion 8aa which is extended laterally from the detect shaft 8a; and, the rotation plate portion 8aa can be rotated about a rotation axis m together with the detect shaft 8a. In the portions of the rotation plate portion 8aa that are symmetric with respect to the rotation axis m, there are formed recessed portions (see FIG. 1); and, to the two recessed portions 8a, there are pressure fixed a pair of rotation terminals 10a and 10b respectively. Thus, the pair of rotation terminals 10a and 10b are formed at different positions on the same circle the center of which is the rotation axis m of the detect shaft 8a.

Figure 3:
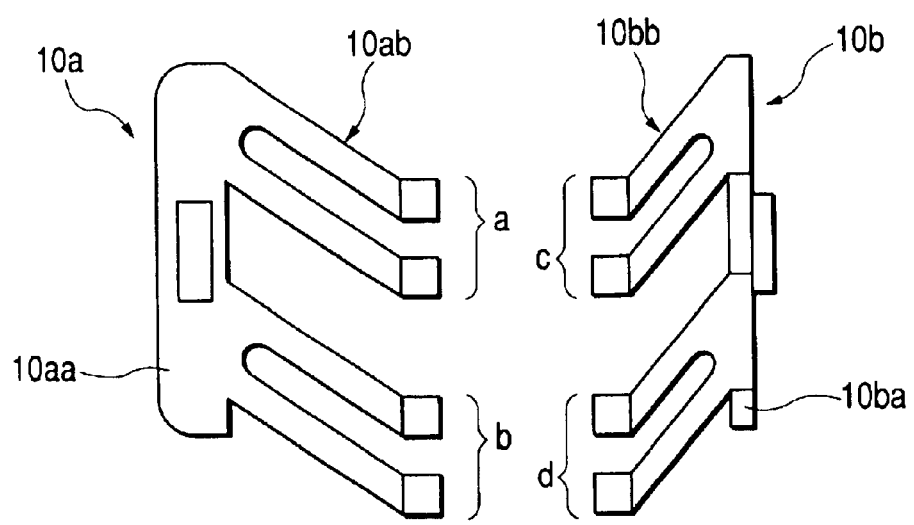
FIG. 3 is a typical view of rotation terminals used in a throttle-opening sensor according to the embodiment of the present invention.

The rotation terminal 10a (10b), as shown in FIG. 3, can be produced by trimming and bending metal such as copper into an integral body and also it is mainly composed of a base portion 10aa (10ba) and a plurality of brush portions 10ab (10bb) which respectively project from the base portion 10aa (10ba). Part of the brush portion 10ab (10bb) constitutes a first contact piece a (c), and the remaining part thereof constitutes a second contact piece b (d).

Accordingly, the first contact piece a (c) and second contact piece b (d) are formed so as to be spaced apart from each other by a given dimension in the rotation radius direction of the pair of rotation terminals 10a and 10b. The first contact piece a of the rotation terminal 10a and the first contact piece c of the rotation terminal 10b are disposed inside the rotation plate portion 8aa, while the second contact piece b of the rotation terminal 10a and the second contact piece d of the rotation terminal 10b are disposed outside the rotation plate portion 8aa.

On the other hand, to the interior of the case 8, there is fixed a printed circuit 11, and the detect shaft 8a is inserted through a hole 11a formed in the central portion of the printed circuit 11. And, the detect shaft 8a penetrates through the hole 11a and the leading end of the detect shaft 8a is loosely fitted into a recessed portion formed on the inner surface side of the cover 8c, so that the detect shaft 8a is rotatably supported by the recessed portion. By the way, between the inner peripheral surface of the hole 11a formed in the printed circuit 11 and the outer peripheral surface of the detect shaft 8a, there is previously set a clearance having a small dimension, so that, when the detect shaft 8a rotates, it can be prevented from interfering with the printed circuit 11.

Figure 2:
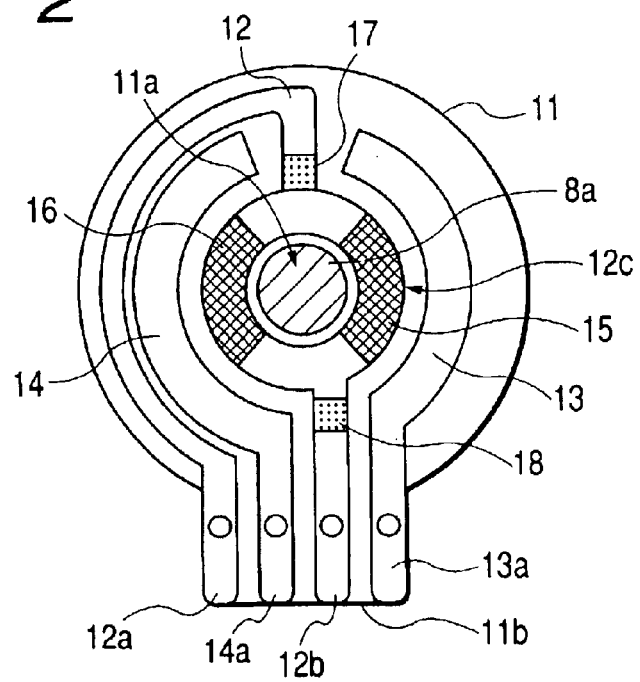
FIG. 2 is a front view of a printed circuit used in a throttle-opening sensor according to the embodiment of the present invention (a view taken along the arrow line II—II shown in FIG. 1)

In the surface of the printed circuit 11 (the surface that is disposed so as to be opposed to the rotation terminals 10a and 10b in a state where the printed circuit 11 is assembled to the case 8b), as shown in FIG. 2, there are printed a first conducting pattern portion 12, a right side second conducting pattern portion 13, and a left side second conducting pattern portion 14. These conducting pattern portions are printed using material such as metal having a good conducting property. The first conducting pattern portion 12 includes a circular-ring portion 12c formed in a circular ring shape in the periphery of the hole 11a and, outside the circular-ring portion 12c, there are formed the right side second conducting pattern portion 13 and left side second conducting pattern portion 14 in such a manner that each of the two portions 13 is formed as an arc-shaped portion.

More specifically, the first conducting pattern portion 12 includes one end portion 12a in the base end 11b of the printed circuit 11, starts from one end portion 12a through the peripheral edge of the printed circuit 11 and arrives at the vicinity of the hole 11a formed in the central portion of the printed circuit 11, and, while forming the circular-ring portion 12c in the periphery of the hole 11a, extends up to the other end portion 12b of the base end 11b. The end portion 12b is connected to a sensor power supply VCC, while the end portion 12a is connected to the ground side.

On the other hand, the right side second conducting pattern portion 13 includes an end portion 13a in the base end 11b of the printed circuit 11 and the end portion 13a is connected to a wire which is used to transmit a detection signal. The left side second conducting pattern portion 14 similarly includes an end portion 14a in the base end 11b of the printed circuit 11 and the end portion 14a is connected to a wire which is used to transmit a detection signal.

Here, the right side of the circular-ring portion 12c is formed along the sliding locus of the first contact piece c of the rotation terminal 10b, whereas the left side thereof is formed along the sliding locus of the first contact piece a of the rotation terminal 10a. Also, the right side second conducting pattern portion 13 is formed along the sliding locus of the second contact piece d of the rotation terminal 10b, whereas the left side second conducting pattern portion 14 is formed along the sliding locus of the second contact piece b of the rotation terminal 10a.

That is, the rotation terminal 10b is assembled in such a manner that, while the first contact piece c thereof is slided on the right side of the circular-ring portion 12c of the first conducting pattern portion 12, the second contact piece d is slided in the right side second conducting pattern portion 13. The rotation terminal 10a is assembled in such a manner that, while the first contact piece a thereof is slided on the left side of the circular-ring portion 12c of the first conducting, pattern portion 12, the second contact piece b is slided in the left side second conducting pattern portion 14.

Further, in the respective partial portions of the right and left portions of the circular-ring portion 12c that are symmetric in position with respect to the rotation axis m, there are formed resistance portions 15 and 16, respectively. These resistance portions 15 and 16 are formed by printing carbon in the sliding ranges of the first contact pieces a and c; and, by adjusting the density of the carbon printing, the resistance values of the resistance portions 15 and 16 can be varied.

As described above, since the first contact pieces a and c are slided on the right and left sides of the circular-ring portion 12c of the first conducting pattern portion 12, the first conducting pattern portion 12 to be contacted with the first contact pieces a and c can be used in common, which makes it possible to reduce the size of the whole throttle-opening sensor. Also, because the resistance portions 15 and 16 are formed in the mutually opposed portions (on the right and left sides) of the circular-ring portion 12c, the resistance portions 15 and 16 can be formed with high accuracy and with ease. By the way, in the portions of the first conducting pattern portion 12 that are situated above and below sides of the circular-ring portion 12c, there are formed another resistance portions 17 and 18 which are similar to the resistance portions 15 and 16.

According to the above-structured throttle-opening sensor 8, in case where the detect shaft 8a is rotated with the rotation of the throttle grip 1, the rotation terminals 11a and 10b are rotated together with the rotation plate portion 8aa. In this rotation, the first contact pieces a and c of the rotation terminals 10a and 10b are slided on the resistance portions 15 and 16, while the second contact pieces b and d are slided respectively on the right side second conducting pattern portion 13 and left side second conducting pattern portion 14, whereby there are generated detection signals respectively in the end portion 13a of the right side second conducting pattern portion 13 and in the end portion 14a of the left side second conducting pattern portion 14. By the way, the thus generated detection signals are both transmitted through a wire H (see FIG. 1) to an electronic control unit which is carried onboard a two-wheeled vehicle.

Figure 5:
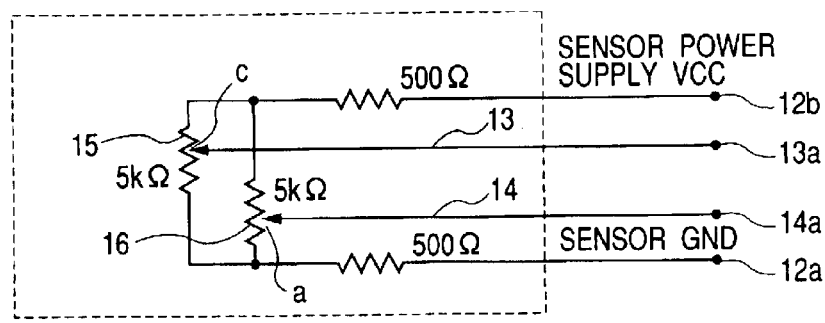
FIG. 5 is a circuit diagram of an electric circuit used in a throttle-opening sensor according to the embodiment of the present invention.
Figure 6:
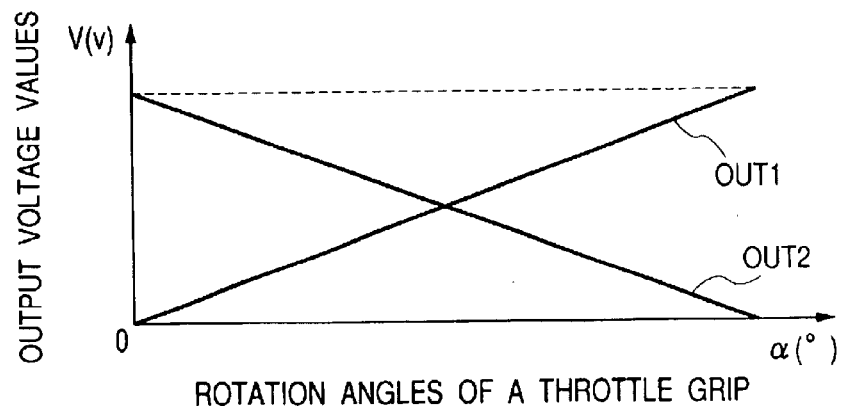
FIG. 6 is a graphical representation of double detection signals outputted by a throttle-opening sensor according to the embodiment of the present invention; and, FIG. 7 is a typical section view of a throttle-opening detect apparatus to which a throttle-opening sensor according to the embodiment of the present invention is applied.

Describing the operation of the throttle-opening sensor with reference to an electric circuit, as shown in FIG. 5, in case where the pair of rotation terminals 10a and 10b are rotated as the detect shaft 8a is rotated, the contact piece c is slided in either upward or downward direction on the resistance portion 15 and the contact piece a is slided on the resistance portion 16 in the opposite direction, so that the outputs of the end portions 13a and 14b are as shown in FIG. 6.

That is, in FIG. 6 where the horizontal axis shows the rotation angles of the throttle grip and the vertical axis shows the output voltage values, a detection signal OUT1 to be outputted from the end portion 13a and a detection signal OUT2 to be outputted from the end portion 14a cooperate together in constituting a double signal system; and, specifically, the detection signals OUT1 and OUT2 vary in the mutually opposite directions and linearly according to the rotation angles of the throttle grip 1, and the sum of the output voltage values for a given rotation angle is always constant.

According to this structure, in case where one of the sensors is out of order, the output voltage from the present sensor decreases down and thus the sum of the output voltages becomes different, which makes it possible to recognize that the present sensor is out of order. In this case, various controls are carried out based only on the output of the other remaining sensor, which makes it possible to secure safety in the running operation of the vehicle. Also, since the resistance portions 17 and 18 are formed in the first conducting pattern portion 12, there can be avoided a possibility that any one of the sensors can be short-circuited to thereby generate an excess current.

With use of a throttle-opening sensor according to the above embodiment, there can be formed a double signal system within one unit and, therefore, when compared with a sensor in which signals are formed in the respective units thereof, the number of parts can be reduced to thereby be able not only to simplify the structure of the throttle-opening sensor but also to reduce the size thereof. That is, in the detect shaft which can be worked with the throttle grip, the pair of rotation terminals are disposed so as to be symmetric with respect to the rotation axis of the detect shaft and the two rotation terminals respectively include contact pieces; and, therefore, a double signal system can be formed within one unit, thereby being able to realize a failsafe.

Although description has been given heretofore of the present embodiment, the present invention is not limited to this; for example, the materials and shapes of the rotation terminals and conducting pattern portions as well as the materials and shapes of the cases and covers constituting the throttle-opening sensor can be changed properly according to cases. Also, in the present embodiment, the resistance portions 15 and 16 are formed in the circular-ring portion 12c of the first conducting pattern portion 12. However, instead of this, the resistance portions may also be formed in the sliding ranges of the contact pieces b and d provided in the right side and left side second conducting portions 13 and 14. Further, although the present embodiment is applied to a throttle-opening sensor which is used to detect the throttle-opening of a two-wheeled vehicle, the present invention can also be applied to a throttle-opening sensor which is used to detect the rotation angle of a throttle grip provided in other vehicles (such as an ATV and a snowmobile).

According to the present invention as set forth in the first aspect, since the pair of rotation terminals are rotated with the rotation of the output shaft and the two rotation terminals respectively output detection signals which vary in the mutually opposite directions, there can be provided a throttle-opening sensor which can reduce the number of parts to thereby be able not only to simplify the thereof but also to reduce the size thereof.

According to the present invention as set forth in the second aspect, in case where the rotation terminal is slided so as to straddle on a part of a circular-ring-shaped portion and the other arc-shaped portion, the circular-ring-shaped portion can be used in common in the pair of rotation terminals, which can contribute toward reducing the size of the throttle-opening sensor still further. Also, since resistance portions are formed in the mutually opposed portions, the resistance portions can be formed with accuracy and with ease.

According to the present invention as set forth in the third aspect, because the resistance values of the resistance portions can be changed by adjusting the density of the carbon printing for formation of the resistance portions, according to the kinds of vehicles and the remaining characteristics of the vehicles, the resistance portions can always be formed properly.

What is claimed is:

1. A throttle-opening sensor, comprising:

a detect shaft rotatable about an axis in conjunction with a throttle grip;

a pair of rotation terminals respectively disposed on different positions in the same circle with the rotation axis of the detect shaft as a center thereof, the pair of rotation terminals being rotatable together with the detect shaft;

first and second contact pieces disposed on each of the rotation terminals at predetermined intervals in a rotation-radius direction of the pair of rotation terminals;

a printed circuit including a first conducting pattern portion printed along sliding loci of the first contact pieces and a second conducting pattern portion printed along sliding loci of the second contact pieces;

a resistance portion printed in a sliding range of the first or second contact piece of the first or second conducting pattern portion, and generating a resistance against a current flowing in the first or second conducting pattern portion, wherein at least two detection signals variable in mutually opposite directions according to the rotation angles of the throttle grip are generated due to that the first and second contact pieces respectively allow the first and second conducting pattern portions to conduct therebetween; and a second resistance portion that is connected in series with the resistance portion.

2. The throttle-opening sensor as set forth in claim 1, wherein one of the first and second conducting pattern portions is formed as a circular-ring-shaped portion with the rotation center of the pair of rotation terminals as a center thereof, at least two of the resistance portions are disposed on mutually opposed portions in the circular-ring-shaped portion respectively, and the other is formed on outside of the circular-ring-shaped portion as an arc-shaped portion.

3. The throttle-opening sensor as set forth in claim 1, wherein the resistance portion is formed by printing carbon on the printed circuit, and resistance value of the resistance portion is variable according to density of the printing.

4. The throttle-opening sensor as set forth in claim 2, wherein the resistance portion is formed by printing carbon on the printed circuit, and resistance value of the resistance portion is variable according to density of the printing.

* * * * *